United States Patent
Jang et al.

(10) Patent No.: US 9,304,187 B2
(45) Date of Patent: Apr. 5, 2016

(54) METHOD FOR ESTIMATING POSITIONS OF DEVICES IN WIRELESS ACCESS SYSTEMS SUPPORTING COMMUNICATION BETWEEN DEVICES, AND APPARATUS FOR SUPPORTING SAME

(71) Applicant: LG ELECTRONICS INC., Seoul (KR)

(72) Inventors: Jiwoong Jang, Anyang-si (KR); Dongguk Lim, Anyang-si (KR); Hangyu Cho, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/377,798

(22) PCT Filed: Feb. 8, 2013

(86) PCT No.: PCT/KR2013/001036
§ 371 (c)(1),
(2) Date: Aug. 8, 2014

(87) PCT Pub. No.: WO2013/119077
PCT Pub. Date: Aug. 15, 2013

(65) Prior Publication Data
US 2015/0018017 A1    Jan. 15, 2015

Related U.S. Application Data

(60) Provisional application No. 61/597,166, filed on Feb. 10, 2012.

(51) Int. Cl.
*G01S 5/14* (2006.01)
*H04W 64/00* (2009.01)
*G01S 5/02* (2010.01)
*H04W 76/02* (2009.01)

(52) U.S. Cl.
CPC .............. *G01S 5/145* (2013.01); *G01S 5/0284* (2013.01); *G01S 5/14* (2013.01); *H04W 64/00* (2013.01); *H04W 76/023* (2013.01)

(58) Field of Classification Search
None
See application file for complete search history.

(56) References Cited

U.S. PATENT DOCUMENTS

| | | | |
|---|---|---|---|
| 7,072,669 B1* | 7/2006 | Duckworth | 455/456.1 |
| 2002/0122003 A1* | 9/2002 | Patwari et al. | 342/450 |
| 2006/0074494 A1* | 4/2006 | McFarland | 700/1 |
| 2011/0093615 A1* | 4/2011 | Novo Diaz et al. | 709/238 |
| 2014/0213306 A1* | 7/2014 | Blankenship et al. | 455/457 |

FOREIGN PATENT DOCUMENTS

| | | |
|---|---|---|
| KR | 10-2006-0017024 | 2/2006 |
| KR | 10-2011-0042769 | 4/2011 |

OTHER PUBLICATIONS

PCT International Application No. PCT/KR2013/001036, Written Opinion of the International Searching Authority dated May 15, 2013, 1 page.

* cited by examiner

*Primary Examiner* — Ashish K Thomas
(74) *Attorney, Agent, or Firm* — Lee, Hong, Degerman, Kang & Waimey

(57) ABSTRACT

The present invention relates to a method for estimating the positions of devices in direct communication with each other, to a method for estimating the structure of a network, and to apparatuses for supporting the methods. According to one embodiment of the present invention, the method for estimating the positions of devices in a wireless access system which supports direct D2D communication between the devices includes the steps of: obtaining information on distance estimation to an adjacent D2D device (for example, a second D2D device) by a D2D device having two reference points (for example, a first D2D device); and estimating the position of the D2D device by using the information on distance estimation and the position information on the two reference points, at which time the information on distance estimation can be obtained through direct D2D communication between the D2D device and the adjacent D2D device.

10 Claims, 14 Drawing Sheets

(a)          (b)

(a)

(b)

METHOD FOR ESTIMATING POSITIONS OF DEVICES IN WIRELESS ACCESS SYSTEMS SUPPORTING COMMUNICATION BETWEEN DEVICES, AND APPARATUS FOR SUPPORTING SAME

CROSS-REFERENCE TO RELATED APPLICATIONS

This application is the National Stage filing under 35 U.S.C. 371 of International Application No. PCT/KR2013/001036, filed on Feb. 8, 2013, which claims the benefit of U.S. Provisional Application Ser. No. 61/597,166, filed on Feb. 10, 2012, the contents of which are all hereby incorporated by reference herein in their entirety.

TECHNICAL FIELD

The present invention relates to a wireless access system supporting device to device communication, and more particularly, to a method for estimating positions of devices in direct communication with each other, a method for estimating a structure of a network, and apparatuses for supporting the methods.

BACKGROUND ART

Hereinafter, a device to device communication environment will briefly be described.

Device to Device (D2D) communication refers to communication between an electronic device and another electronic device. In a broad sense, D2D communication refers to wire or wireless communication between electronic devices or communication between a machine and a device controlled by a person. However, it is general that D2D communication recently refers to wireless communication between electronic devices performed without control of a person.

In the early 1990s when D2D communication had been introduced, D2D communication had been recognized as remote control or telematics and D2D communication markets had been very restrictive. However, D2D communication markets have received attention all over the world since D2D communication had been able to grow rapidly for last several years. Particularly, D2D communication has exerted its great influence at point of sales (POS) and security related application markets in the fields of fleet management, remote monitoring of machine and facilities, measurement of working time on construction machine facilities, and smart meter automatically measuring heat or the use of electricity. It is expected that D2D communication will be used for various purpose of uses in association with the existing mobile communication, wireless high-speed Internet, and low power communication solutions such as Wi-Fi and Zigbee and that its coverage will be extended to business to consumer (B2C) markets without limitation to business to business (B2B) markets.

In the D2D communication age, since all machines provided with a subscriber identity module (SIM) card may be able to perform data transmission and reception, they may remotely be controlled. For example, D2D communication technologies may be used for many machines and equipments such as cars, trucks, trains, containers, vending machines, and gas tanks. In this way, application ranges of D2D communication technologies are very broad.

Various methods for estimating a position of a user equipment used conventionally are provided. However, the existing methods could have performed position estimation only if three or more reference points are provided.

DISCLOSURE

Technical Problem

An object of the present invention devised to solve the conventional problem is to provide a reliable communication method for D2D devices.

Another object of the present invention is to provide a method for performing position estimation of each device through distance estimation between devices by using devices in direct communication with each other.

Other object of the present invention is to provide a method for estimating a structure of a direct communication network between devices through distance estimation of devices in direct communication with each other.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To solve the aforementioned technical problems, the present invention provides a method for estimating positions of devices in direct communication with each other, a method for estimating a structure of a network, and apparatuses for supporting the methods.

In one aspect of the present invention, a method for estimating positions of devices in a wireless access system which supports D2D direct communication comprises the steps of acquiring, at a D2D device having two reference points, distance estimation information with a neighboring D2D device; and performing position estimation of the D2D device by using the distance estimation information and position information on the two reference points, wherein the distance estimation information is acquired through D2D direct communication between the D2D device and the neighboring D2D device.

The method may further comprise the steps of transmitting a request signal for acquiring the distance estimation information from the D2D device to the neighboring D2D device; and receiving a response signal from the neighboring D2D device in response to the request signal. At this time, the distance estimation information may be acquired based on the response signal.

At this time, the request signal may include absolute time information or relative time information, and response signal may include received time information on the request signal, time offset, or information on transmitted time of the response signal.

Also, the neighboring D2D device may have two reference points, and the distance estimation information may be a coordinate where a measured distance between the D2D device and the neighboring D2D device has a minimum value.

Alternatively, the D2D device may periodically transmit or broadcast a reference signal to the neighboring D2D devices to acquire the distance estimation information.

In another aspect of the present invention, a D2D device for estimating a position in a wireless access system which supports D2D direct communication comprises a radio frequency (RF) module; and a processor for performing position estimation, wherein the processor acquires distance estimation information between the D2D device having two reference points and a neighboring D2D device, and performs position estimation of the D2D device by using the distance estimation information and position information on the two reference points, and the distance estimation information is acquired through D2D direct communication between the D2D device and the neighboring D2D device.

Also, the processor may transmit a request signal for acquiring the distance estimation information to the neighboring D2D device and receive a response signal from the neighboring D2D device in response to the request signal, and the distance estimation information may be acquired based on the response signal.

At this time, the request signal may include absolute time information or relative time information, and response signal may include received time information on the request signal, time offset, or information on transmitted time of the response signal.

Also, the neighboring D2D device may have two reference points, and the distance estimation information may be set to a coordinate where a measured distance between the D2D device and the neighboring D2D device has a minimum value.

Alternatively, the D2D device may periodically transmit a reference signal to the neighboring D2D device to acquire the distance estimation information.

The above aspects of the present invention are only a part of the embodiments of the present invention, and various embodiments based on technical features of the present invention may be devised and understood by the person with ordinary skill in the art based on the detailed description of the present invention.

Advantageous Effects

According to the embodiments of the present invention, the following advantages may be obtained.

First of all, even in the case that D2D devices perform handover, a reliable communication method for D2D devices may be provided.

Second, D2D devices, which perform D2D direct communication, may estimate their respective positions through distance estimation between the D2D devices.

Third, a network structure of a direct communication network between devices may be estimated through distance estimation between devices in D2D direct communication with each other.

It will be appreciated by persons skilled in the art that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Figure 1:
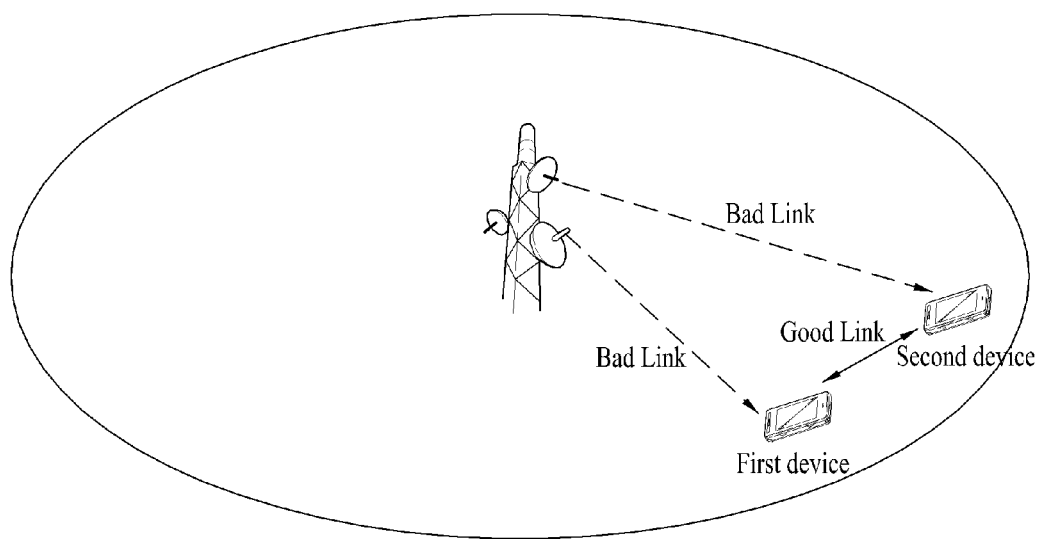
FIG. 1 is a diagram illustrating one of direct communication methods between D2D devices.

The embodiments of the present invention discloses a method for estimating positions of devices in direct communication with each other in a wireless access system that supports D2D environment and apparatuses for supporting the same.

The following embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

In the description of drawings, process or steps that may make the subject matter of the present invention obscure will not be disclosed. Also, process or steps that may be understood by the person with ordinary skill in the art will not be disclosed.

In this specification, the embodiments of the present invention have been described based on the data transmission and reception between a base station and a mobile station. In this case, the base station means a terminal node of a network, which performs direct communication with the mobile station. A specific operation which has been described as being performed by the base station may be performed by an upper node of the base station as the case may be.

In other words, it will be apparent that various operations performed for communication with the mobile station in the network which includes a plurality of network nodes along with the base station may be performed by the base station or network nodes other than the base station. At this time, the base station (BS) may be replaced with terms such as a fixed station, Node B, eNode B (eNB), an advanced base station (ABS), and an access point (AP). Also, in the embodiments of the present invention, the base station may be used as a reference point (RP).

Also, in the present invention, a D2D device means a terminal that performs communication between devices, and may simply be referred to as a device. Also, the D2D device may be replaced with terms such as a mobile station (MS), a user equipment (UE), a subscriber station (SS), a mobile subscriber station (MSS), a mobile terminal, a terminal, a device, or a machine to machine (M2M) device.

Furthermore, a transmitting end means a fixed or mobile node that transmits data services or voice services while a receiving end means a fixed or mobile node that receives data services or voice services. Accordingly, in an uplink, the mobile station could be the transmitting end while the base station could be the receiving end. Likewise, in a downlink, the mobile station could be the receiving end while the base station could be the transmitting end.

The embodiments of the present invention may be supported by standard documents disclosed in at least one of wireless access systems, i.e., IEEE 802.xx system, 3GPP system, 3GPP LTE system, and 3GPP2 system. Namely, among the embodiments of the present invention, apparent steps or parts which are not described may be supported by the above standard documents.

Also, all terminologies disclosed herein may be described by the above standard documents. Particularly, the embodiments of the present invention may be supported by one or more of the 3GPP LTE/LTE-A standard documents.

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out.

The embodiments of the present invention will be described in detail with reference to the accompanying drawings to be easily carried out by the person with ordinary skill in the art to which the present invention pertains. However, it is to be understood that the present invention may be implemented by various modifications and is not limited to the embodiments which will be described herein. In the drawings, parts which are not related with the description of the present invention will be omitted to clarify the present invention. Wherever possible, the same reference numbers will be used throughout the drawings to refer to the same or like parts.

In this specification, when some part "includes" some elements, it means that the part may further include other elements unless mentioned to the contrary. Also, terminologies " . . . part," " . . . block," and " . . . module" mentioned in this specification mean a unit processing at least one function or operation, and may be implemented by hardware, software or combination of hardware and software.

Also, specific terminologies hereinafter used in the embodiments of the present invention are provided to assist understanding of the present invention, and various modifications may be made in the specific terminologies within the range that they do not depart from technical spirits of the present invention.

For example, in the embodiments of the present invention, a multicast traffic indication (MTI) field may be used to refer to a multicast paging message indication field, and a reliable traffic indication (RTI) field may be used to refer to a reliable paging message indication field. Also, the terminology 'traffic' may be used to refer to the terminology 'data.

1. D2D Communication

In the embodiments of the present invention, D2D communication means a communication type performed between (1) user equipments through a base station (e.g, controlled D2D) and between (2) a base station and user equipments without control of a person, or a communication type between (3) D2D devices (e.g., uncontrolled D2D). Accordingly, the D2D device means a user equipment that can support communication between the D2D devices.

An access service network for D2D service will be defined as a D2D access service network (ASN), and a network entity that performs communication with D2D devices will be referred to as a D2D server. The D2D server performs D2D application, and provides D2D specific service for one or more D2D devices. D2D feature is a feature of D2D application, and one or more features may be required to provide application. D2D device group means a group of D2D devices that share one or more features.

The number of devices (that may be referred to as various terms such as D2D device, D2D communication device, and machine type communication (MTC) device) that perform communication in a D2D mode will be increased gradually in a certain network as their device application types are increased.

Examples of device application types include (1) security, (2) public safety, (3) tracking and tracing, (4) payment, (5) healthcare, (6) remote maintenance and control, (7) metering, (8) consumer device, (9) fleet management at POS (Point Of Sales) and security related application market, (10) communication between devices of vending machines, (11) remote controlling of machine and facilities, measurement of working time on construction machine facilities, and smart meter automatically measuring heat or the use of electricity, and (12) surveillance video communication of a surveillance camera. However, the device application types are not limited to the above examples, and the other various device application types may be used.

Another feature of the D2D device is low mobility or has no mobility once the D2D device is installed. That is, low mobility or no mobility means that the D2D device is stationary for a long time. The D2D communication system may simplify or optimize mobility-associated operations for a specific D2D application having a fixed location such as secured access and surveillance, public safety, payment, remote maintenance and control, and metering.

FIG. 1 is a diagram illustrating one of direct communication methods between D2D devices.

The greatest purpose of D2D direct communication is to save the power and resources as compared with communication through a base station by allowing D2D devices, which are located at a short distance from each other or have good channel statuses, to perform direct communication through a direct link. In particular, in case of D2D devices (for example, the first device and the second device) located at a short distance from the cell edge as illustrated in FIG. 1, the resource and power saving advantage due to D2D direct communication is very great.

For example, if the base station and the D2D device are respectively connected to a link (that is, controlled D2D status), since the D2D device should reserve uplink and downlink resources, in case of two D2D devices, a total of four radio resources are reserved by the D2D devices. However, in case of D2D direct communication, since a link between the D2D devices is only to be connected, two radio resources are reserved by the D2D devices. Accordingly, D2D direct communication has the greater resource and power saving advantage than that of communication through a cellular network. Also, although FIG. 1 illustrates that two D2D devices perform D2D direct communication, more than two D2D devices may perform D2D direct communication.

2. D2D Device

Figure 2:
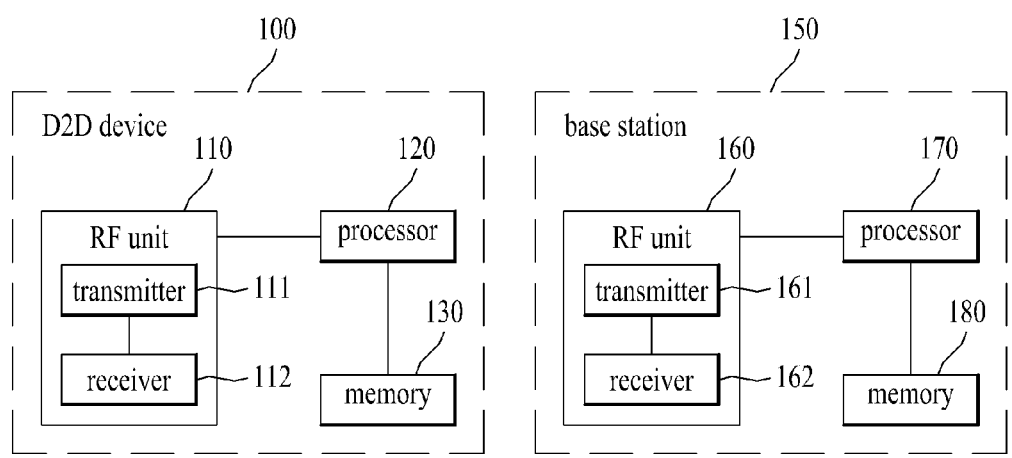
FIG. 2 is a brief diagram illustrating configurations of a D2D device and a base station in accordance with the embodiment of the present invention.

FIG. 2 is a brief diagram illustrating configurations of a D2D device and a base station in accordance with one embodiment of the present invention.

In FIG. 2, each of a D2D device 100 and a base station 150 may include a radio frequency (RF) unit 110, 160, and a processor 120, 170. Each of the D2D device and the base station may selectively include a memory 130, 180. Although FIG. 2 illustrates one D2D device and one base station, a D2D communication environment may be configured among a plurality of D2D devices and a plurality of base stations.

Each RF unit 110, 160 may include a transmitter 111, 161 and a receiver 112, 162. In case of the D2D device 100, the transmitter 111 and the receiver 112 may be configured to transmit and receive a signal to and from the base station 150 and other D2D devices, and the processor 120 may be functionally connected with the transmitter 111 and the receiver 112 to control the signal transmission and reception process of the transmitter 111 and the receiver 112 to and from other devices. Also, the processor 120 may perform various kinds of processing for a signal for transmission and then transmit the processed signal to the transmitter 111, and may perform processing for the signal received by the receiver 112.

The processor 120 may store information included in the exchanged message in the memory 130 if necessary. The D2D device 100 configured as above may perform methods of various embodiments according to the present invention which will be described later.

In the meantime, although not shown in FIG. 2, the D2D device 100 may include various additional elements in accordance with its device application type. For example, if the corresponding D2D device 100 is for smart metering, the corresponding D2D device 100 may include additional element for power measurement. An operation for power measurement may be controlled by the processor 120 shown in FIG. 2, or may be controlled by a separate processor (not shown).

Although FIG. 2 illustrates an example of communication performed between the D2D device 100 and the base station 150, a method for D2D communication according to the present invention may be performed between one or more D2D devices, each of which may perform the method according to various embodiments, which will be described later, in the same manner as each device shown in FIG. 2.

In case of the base station 150, the transmitter 161 and the receiver 162 may be configured to transmit and receive a signal to and from another base station, a D2D server and D2D devices, and the processor 170 may be functionally connected with the transmitter 161 and the receiver 162 to control the signal transmission and reception process of the transmitter 161 and the receiver 162 to and from other devices. Also, the processor 170 may perform various kinds of processing for a signal for transmission and then transmit the processed signal to the transmitter 161, and may perform processing for the signal received by the receiver 162. The processor 170 may store information included in the exchanged message in the memory 180 if necessary. The base station 150 configured as above may perform the methods of various embodiments which have been described as above.

Each processor 120, 170 of the D2D device 110 and the base station 150 commands (for example, controls, coordinates or manages) the operation of each of the D2D device 110 and the base station 150. Each processor 120, 170 may be connected with the memory 130, 180 that stores program codes and data therein. The memory 130, 180 is connected with the processor 120, 170 and stores an operating system, an application, and general files therein.

The processor 120, 170 of the present invention may be referred to as a controller, a microcontroller, a microprocessor, or a microcomputer. In the meantime, the processor 120, 170 may be implemented by hardware, firmware, software, or their combination. If the embodiments of the present invention are implemented by hardware, the processor 120, 170 may include application specific integrated circuits (ASICs), digital signal processors (DSPs), digital signal processing devices (DSPDs), programmable logic devices (PLDs), and field programmable gate arrays (FPGAs).

In the meantime, if the embodiments of the present invention are implemented by firmware or software, the firmware or software may be configured to include a module, a process, or a function, which performs functions or operations of the present invention. The firmware or software may be provided in the processor 120, 170 or may be stored in the memory 130, 180 and then may be driven by the processor 120, 170.

The embodiments which will be described later may be performed between the D2D device and the base station, which are illustrated in FIG. 2 and between the D2D devices.

3. Position Estimation System 3.1 Position Estimation System Based on Cell ID

Figure 3:
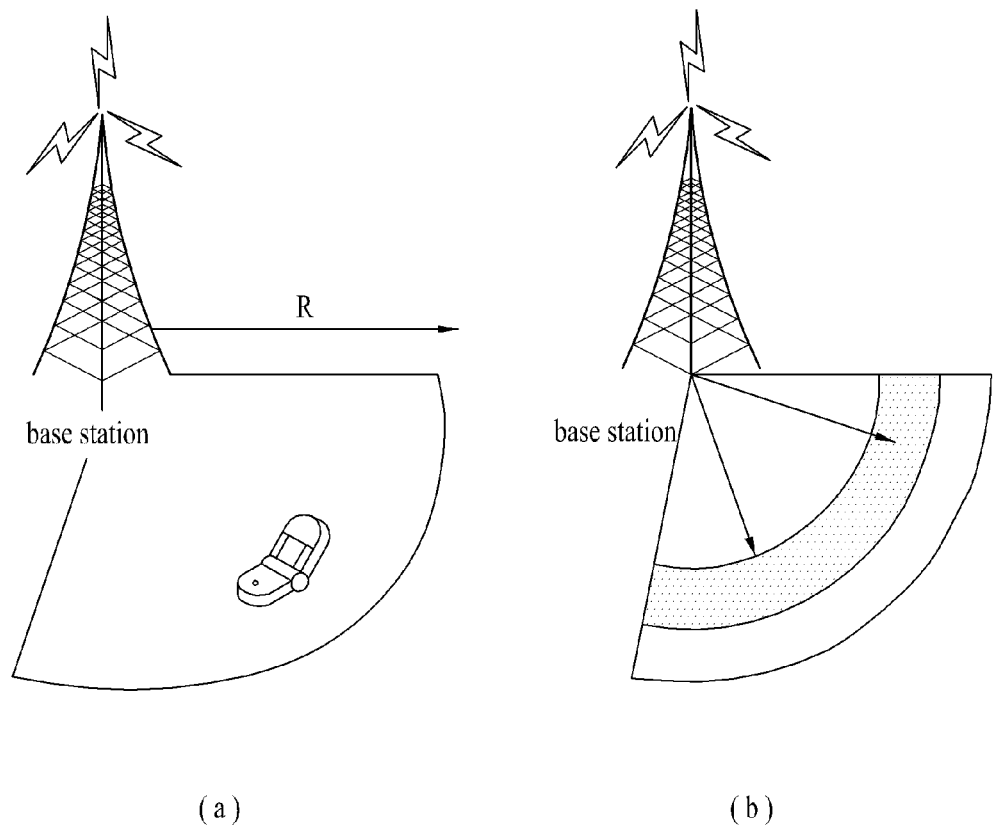
FIG. 3 is a diagram illustrating an example of a position estimation system based on a cell identifier.

FIG. 3 is a diagram illustrating an example of a position estimation system based on a cell identifier.

The position estimation system of FIG. 3 is a radio positioning system used by mobile communication providers to provide a location based service (LBS), and is the simplest system that does not require a separate user equipment for radio positioning and network change. Since this system does not require separate cost, it has economic feasibility, and is suitable for an application service, which requires large capacity, as it may quickly obtain position information.

However, accuracy of radio positioning may be varied depending on a cell size of a mobile communication network. Accuracy of position estimation becomes high if a cell has a small size and is arranged densely, whereas positioning accuracy is remarkably lowered in a macro cell such as the outskirts of city or a farming area.

Enhanced cell ID is to improve positioning accuracy of cell ID by using a value obtained by measuring a distance between a user equipment and a base station or radio propagation time. The position estimation system based on path loss or round-trip time (RTT) has been suggested. However, as the position estimation system based on path loss has a drawback in that accuracy is lowered due to shading or fading, the position estimation system based on RTT has been used mainly and its accuracy in radio positioning is several hundred meters.

3.2 Fingerprinting System

Figure 4:
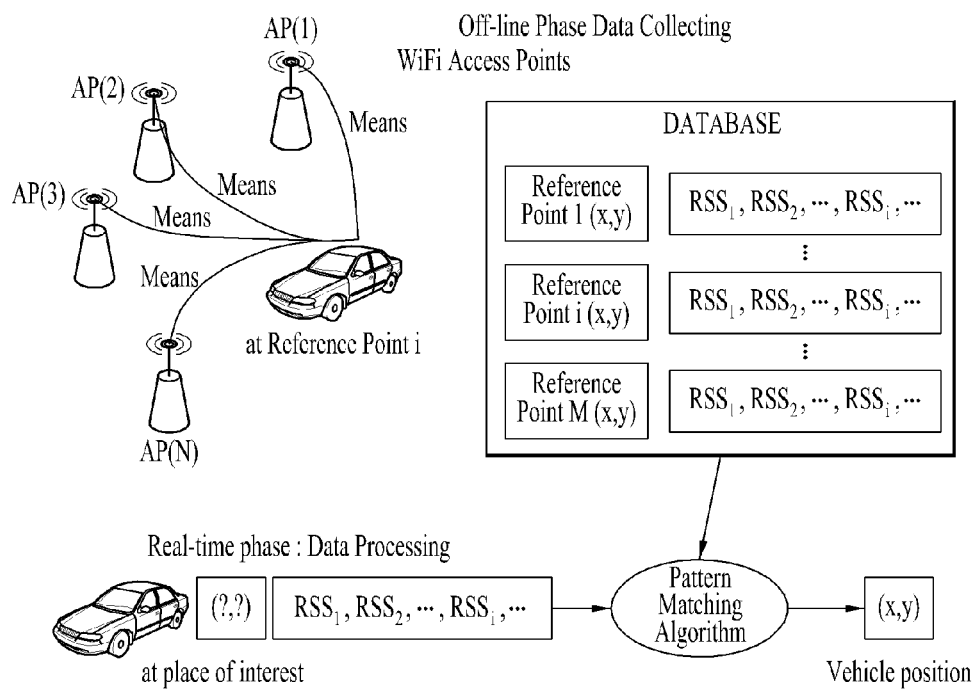
FIG. 4 is a diagram illustrating an example of a position estimation system based on a fingerprinting system.

FIG. 4 is a diagram illustrating an example of a position estimation system based on a fingerprinting system.

Fingerprinting of FIG. 4 is a position estimation system based on probabilistic modeling, and estimates a position of a user equipment by using information of peripheral environment and noise. The position estimation system based on fingerprinting estimates a position of a user equipment by comparing a position of an access point (AP) which is already known with received signal strength (RSS) of a user equipment of which position should be known, by using experience data. Since a direction to which a moving object is oriented or peripheral environment information including noise is reflected in position estimation, the position estimation system based on fingerprinting provides high accuracy.

However, a problem occurs in that for position estimation based on fingerprinting, the user equipment and the base station should acquire a propagation feature value several times, and should newly acquire a propagation feature value for a position of a grid even when environmental change such as structural change of a building occurs. Also, a problem occurs in that system complexity is increased as the user equipment and the base station should search for a database (DB) for position estimation.

Operation per step of the fingerprinting system will be described as follows.

A. Offline Step

At the offline step, positions of different grids are collected using RSS from different access points (APs) through local search, and then are stored in a fingerprinting DB.

B. Online Step

The user equipment measures RSS of different points as a fingerprinting vector value, and performs position estimation by using the measured RSS vector and Euclidean distance between the respective fingerprintings stored in the DB.

3.3 ToA (Time of Arrival) System

Figure 5:
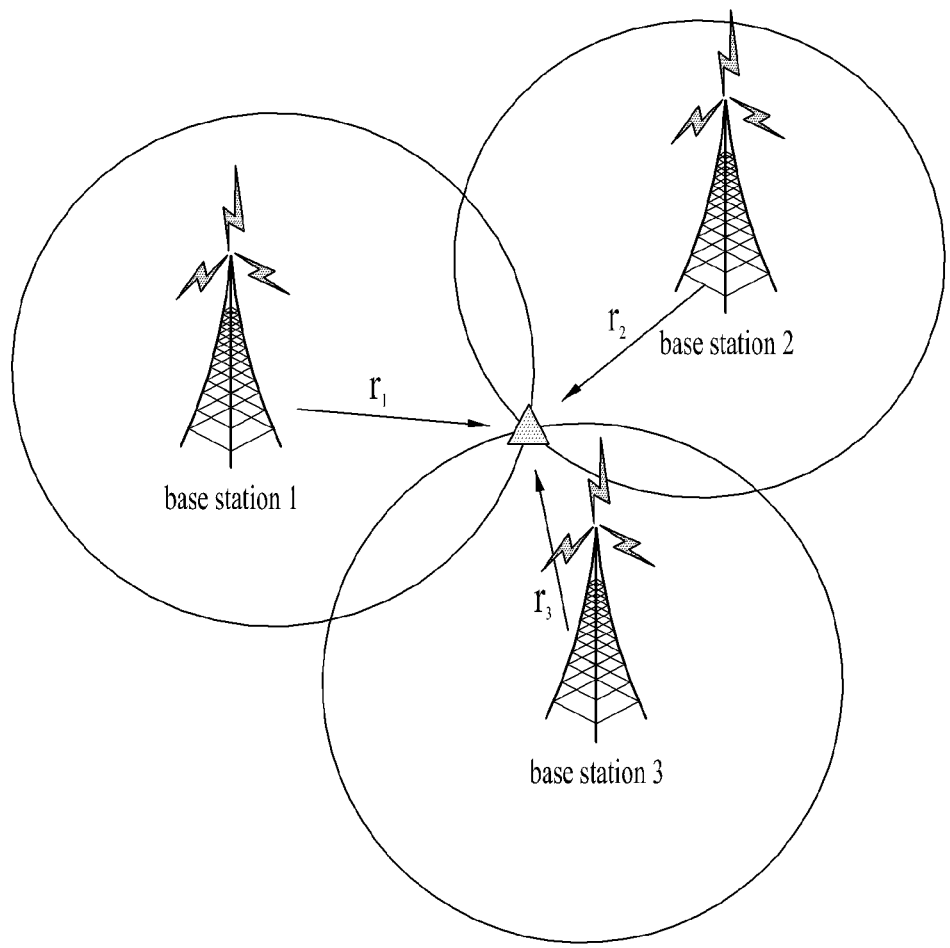
FIG. 5 is a diagram illustrating an example of a position estimation system based on ToA system.

FIG. 5 is a diagram illustrating an example of a position estimation system based on ToA system.

Triangulation used in FIG. 5 is the most general position estimation system, and estimates a position where a mobile terminal (user equipment) is actually located, by measuring a distance from three reference points to the user equipment.

ToA is the most representative system based on triangulation, and is the technology for acquiring position information by using difference in signal arrival time between one service base station 1 (or beacon), which has received a signal of the user equipment, and two neighboring base stations (base stations 2, 3). In other words, according to the ToA system, a virtual circle (area) based on a signal arrival time value occurs at each base station, and a node of the circles is estimated as a position of the user equipment.

3.4 TDoA (Time Difference of Arrival) System

Figure 6:
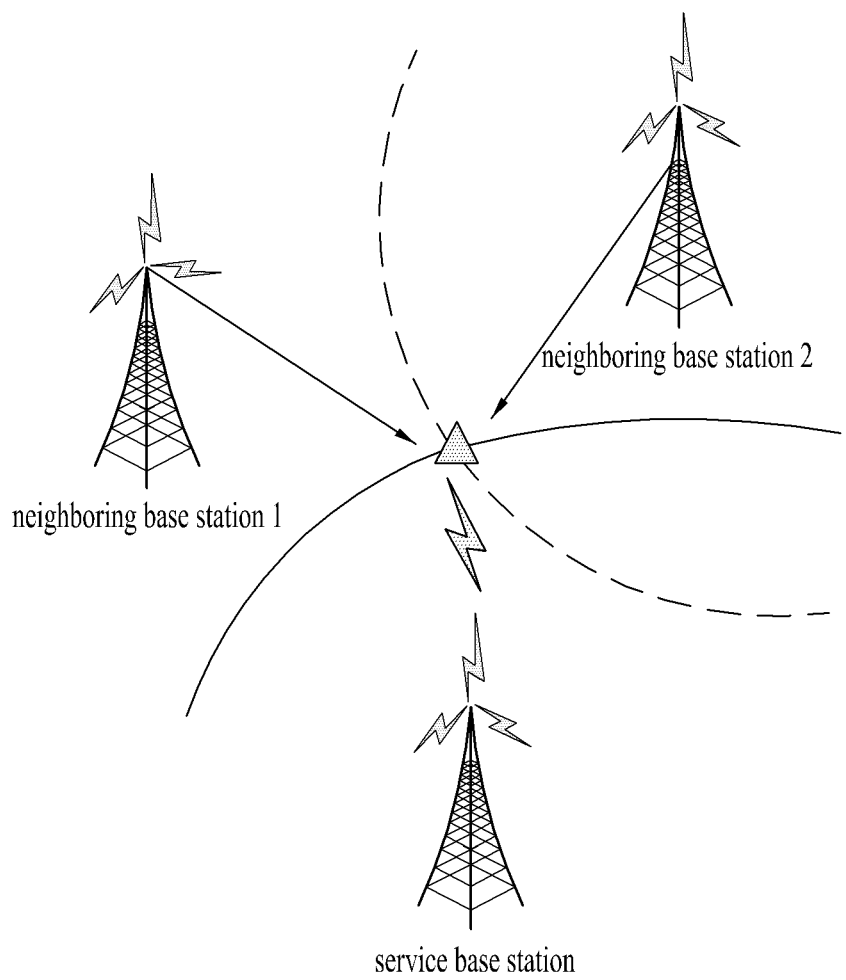
FIG. 6 is a diagram illustrating an example of a position estimation system based on TDoA system.

FIG. 6 is a diagram illustrating an example of a position estimation system based on TDoA system.

Unlike the ToA system, the TDoA system is to measure signal delay of neighboring base stations on the basis of a signal of a service base station. According to the TDoA system, several hyperbolic curves occur with respect to a value obtained by measuring difference in signal arrival time between a service base station signal and a neighboring base station signal, whereby a node of the hyperbolic curves is estimated as a position of a user equipment.

3.5 AoA (Angle of Arrival) System

Figure 7:
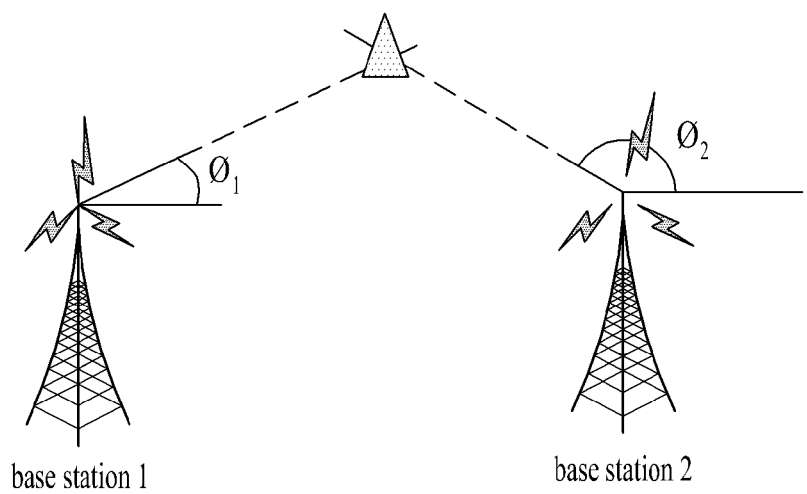
FIG. 7 is a diagram illustrating an example of a position estimation system based on AoA system.

FIG. 7 is a diagram illustrating an example of a position estimation system based on AoA system.

Referring to FIG. 7, according to the AoA system, if two base stations (base stations 1, 2) receive a signal transmitted from a user equipment, a position of the user equipment is estimated using difference in angles between signals received from the respective base stations.

According to the AoA system, a plurality of antennas are arranged per direction, and by receiving an antenna number of an antenna which has been transmitted a signal, whereby a point where a direction of each antenna meets a signal source is estimated as a position of the user equipment. As the most representative example, the AoA system is applied to an aircraft (e.g., user equipment) and a system that provides information on an angle of direction at a very high frequency band for a military system at the field.

3.6 RSS (Received Signal Strength) Based System

Figure 8:
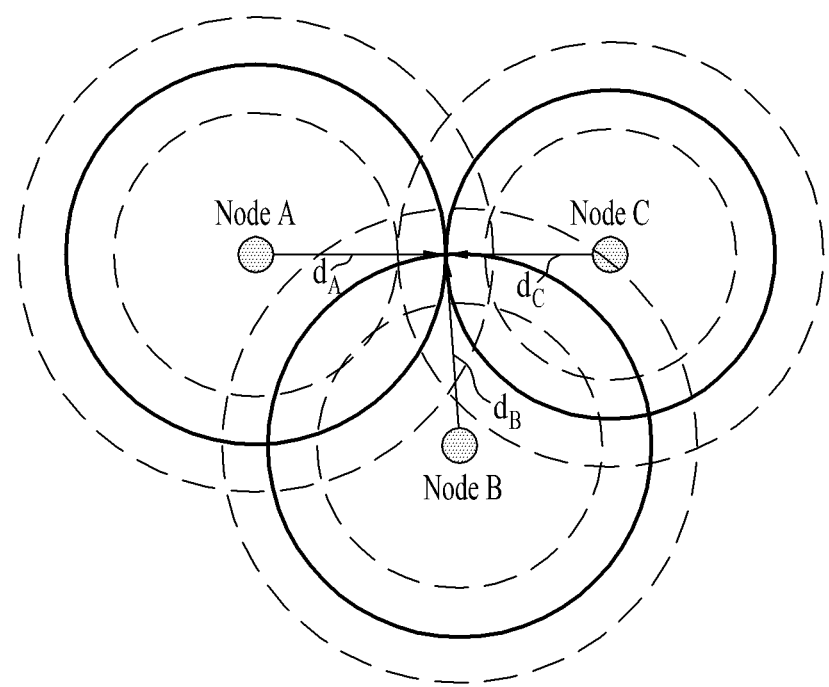
FIG. 8 is a diagram illustrating an example of a position estimation system based on RSS system.

FIG. 8 is a diagram illustrating an example of a position estimation system based on RSS system.

Referring to FIG. 8, the RSS based position estimation system is the technology used mainly in a radio sensor network, and uses RSS based on a distance between sensor nodes. In order to estimate a position based on RSS, three or more nodes (Nodes A, B, C) are required, and the position is estimated using a triangulation system. Also, since the RSS based system is simple and has high economic feasibility due to use of signals of a network which is already used, it is expected that studies of the RSS based system will continue to be made.

However, since the radio positioning system based on RSS uses a path loss model, received strength of a signal is varied in various manners if the signal is affected by a channel such as multi-path fading channel, whereby accuracy of position information may be deteriorated. Accordingly, a study on an algorithm that may estimate channel change is being made.

The user equipment used in the aforementioned position estimation systems may be a general mobile terminal. However, in the embodiments of the present invention, the general mobile terminal may be replaced with D2D device.

Currently, the system which is used most widely as the position estimation system of the user equipment is a triangulation system based on ToA. The ToA system is widely used owing to its various advantages that a measurement algorithm is simple, a reverse link is not required, and both uplink and downlink systems may be implemented. However, use of the triangulation system may be restricted in that the user equipment needs three reference points to use the triangulation system (in this case, reference point means an entity, of which position is known, which transmits a reference signal, and a base station, an access point and/or a fixed node may be used as the entity of which position is known).

Accordingly, the embodiments of the present invention, which will be described hereinafter, suggest a method for estimating positions of D2D devices by exchanging position information (for example, position that may be estimated from a reference point) between user equipments, which access two or less reference points, by using D2D direct communication.

4. D2D Direct Communication Based Position Estimation System

The embodiments which will be described hereinafter relate to methods for estimating positions of D2D devices and a network structure of the D2D devices.

The greatest problem of the ToA (triangulation) system which is most widely used as the existing position estimation system of the user equipment is that information between three reference points of which exact positions are known and the D2D device should be provided. Accordingly, it is not possible for the D2D devices having two or less reference points to perform position estimation based on the ToA system. However, in case of the D2D devices that enable D2D direct communication, as each D2D device is operated as a reference point for the other D2D device, the position of the D2D device and a network structure of the device may be estimated even in the case that the position of the D2D device cannot be estimated by the existing ToA estimation system.

Figure 9:
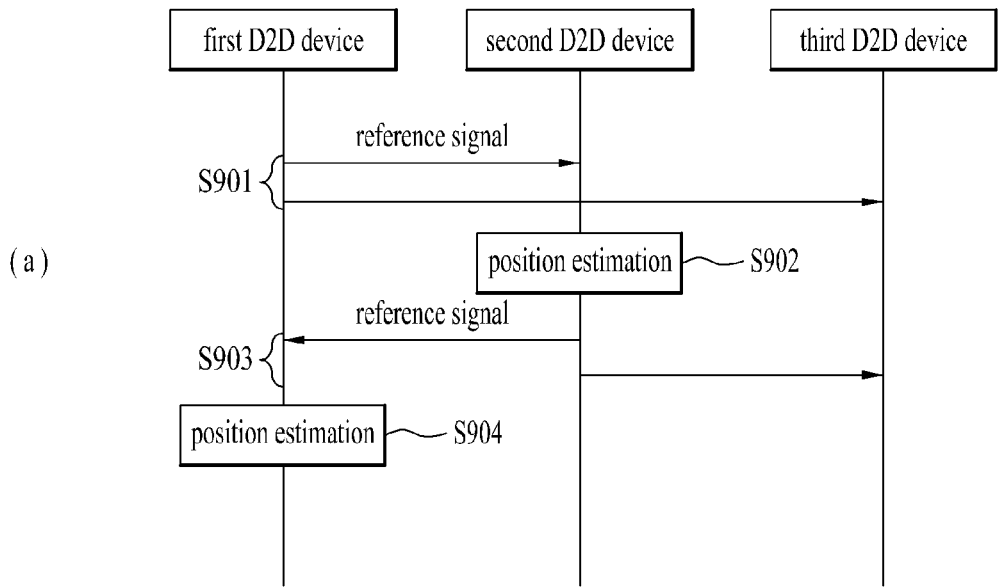
FIG. 9 is a diagram illustrating methods for allowing D2D devices to perform distance estimation between D2D devices for position estimation in accordance with the embodiment of the present invention.
Figure 9:
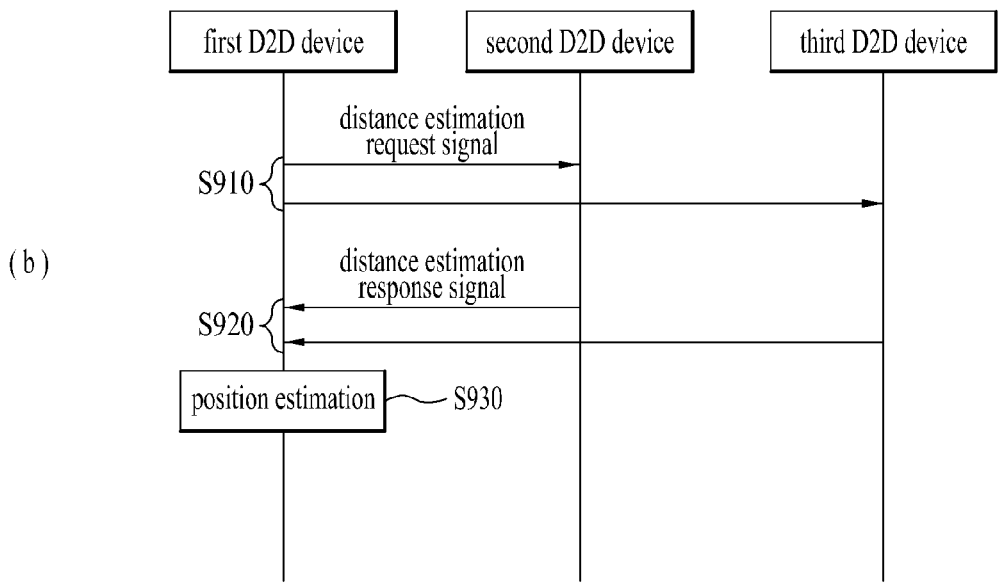

FIG. 9 is a diagram illustrating methods for allowing D2D devices to perform distance estimation between D2D devices for position estimation in accordance with the embodiment of the present invention.

In case of the D2D devices that enable D2D direct communication, as one D2D device is operated as a reference point for the other D2D device even in the case that there are no three reference points within one RAT, the position of the corresponding D2D device and a network structure of the device may be estimated.

For example, the D2D device (e.g., first D2D device) may estimate the position by using additional information (for example, distance estimation information) from neighboring D2D devices (e.g., second D2D device and third D2D device). At this time, the neighboring D2D devices may be the devices of which exact positions are estimated, or may be the devices having two or less reference points.

4.1 Method for Periodically Estimating Distance

FIG. 9(a) illustrates a method for allowing D2D devices to periodically transmit a reference signal that may estimate a distance between the D2D devices. Referring to FIG. 9(a), a first D2D device and/or a second D2D device may transmit a reference signal to a specific D2D device or broadcast the reference signal to all the neighboring D2D devices (S901, S903).

The first D2D device and/or the second D2D device may estimate the distance with the neighboring D2D device on the basis of the reference signal, and may perform its position estimation by using the estimated distance (S902, S904).

At this time, the steps S901 and S903 may be performed through D2D direct communication.

4.2 Method for Estimating Distance Based Event

FIG. 9(b) illustrates a method for allowing D2D devices to request a signal that may perform distance estimation.

Referring to FIG. 9(b), a first D2D device may transmit a distance estimation request signal for requesting neighboring D2D devices of a signal, which may perform distance estimation, to a specific D2D device, or may broadcast the distance estimation request signal to all the neighboring D2D devices. At this time, the specific D2D device may be a user equipment which is D2D-linked with the first D2D device, or a D2D device having the best channel status through scanning of the first D2D device (S910).

A second D2D device and/or a third D2D device, which has received the distance estimation request signal, transmits a distance estimation response signal to the first D2D device as a signal that may estimate the distance. At this time, the distance estimation response signal may be the reference signal of FIG. 9(a) (S920).

The first D2D device may estimate its position by using the distance estimation response signal received from the second D2D device and/or the third D2D device (S930).

In FIG. 9(b), the D2D devices that have received the distance estimation request signal may transmit or broadcast the distance estimation response signal of the step S920 immediately or after a certain time period. At this time, the distance estimation response signal may be transmitted or broadcasted on a specific radio resource (for example, time window or frame).

At this time, the steps S910 and S920 may be performed through D2D direct communication.

4.3 Method for Estimating Distance Based on Time Information

In the embodiments of the present invention, time information may be used for distance estimation. For example, at the step S910 of FIG. 9(b), the distance estimation request signal may include information such as time stamp or start time offset. Also, at the step S920, the distance estimation response signal may include signal received time information, time offset and/or response signal Tx time. Accordingly, the first D2D device and the second D2D device may perform distance estimation for position estimation by using time information included in the distance estimation request signal and/or the distance estimation response signal.

If the D2D device that enables D2D direct communication needs additional reference point for position estimation in FIG. 9(b), the D2D device may transmit or broadcast a signal (for example, reference signal or sequence) for distance estimation to the neighboring D2D devices. Hereinafter, detailed methods for transmitting the signal for distance estimation will be described.

4.3.1 If the D2D device that enables D2D direct communication needs additional reference point for position estimation, the D2D device may transmit the signal (for example, reference signal or sequence) through a given resource or broadcast the signal through a common resource.

4.3.2 If the D2D device that enables D2D direct communication needs additional reference point for position estimation, the D2D device may transmit an indication signal indicating that the signal for distance estimation will be transmitted to a specific D2D device, or may broadcast the indication signal to all the neighboring D2D devices. At this time, the indication signal may include information on a resource to which the signal for distance estimation will be transmitted.

4.3.3 The neighboring device that has received the reference signal for distance estimation between the D2D devices may transmit the estimated distance information to the D2D device (or linked D2D device) of the other party through a direct communication link. At this time, the information may be transmitted by using a general D2D direct communication system.

4.3.4 If the D2D device that enables D2D direct communication needs additional reference point for position estimation, the D2D device may transmit the signal for estimating distance estimation to neighboring D2D devices as much as the number of needed distance information (see FIG. 9(a)/(b)). At this time, since the distance estimation system based on time information has a great error rate, the neighboring D2D devices may be selected in the order of better channel quality.

5. Method for Estimating Position Based on Distance Estimation Information Between D2D Devices Hereinafter, in a system that supports D2D communication, detailed embodiments of a method for estimating a position of a D2D device through distance estimation between D2D devices will be described. In other words, in the embodiments which will be described hereinafter, the D2D devices estimate the distance with their neighboring D2D device on the basis of the described in section 4 above and acquire their position information by using the estimated distance information.

Hereinafter, a case where the D2D device that has recognized two or less reference points has additional reference point through D2D direct communication will be described. However, although the D2D device has three reference points in the present invention, the aspect of the present invention is not restricted by the number of reference points, and may be based on the ToA system and applied to the case where three or more reference points are required.

For convenience of explanation in the following description, it is assumed that the D2D device is a mobile station (MS) considering minimum mobility and an access point (AP) is used as the reference point. The MS may be used to refer to UE, D2D device and terminal, and the AP may also be replaced with eNB and BS.

Figure 10:
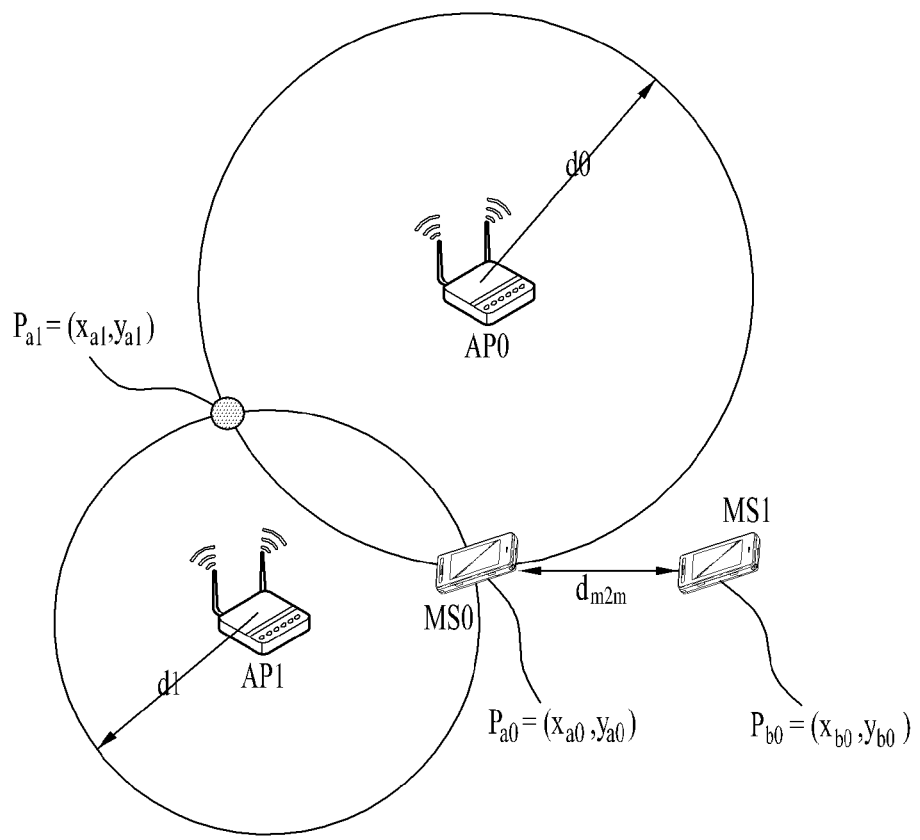
FIG. 10 is a diagram illustrating one of methods for allowing D2D devices having two reference points to estimate a position through D2D direct communication in accordance with the embodiment of the present invention.

FIG. 10 is a diagram illustrating one of methods for allowing D2D devices having two reference points to estimate a position through D2D direct communication in accordance with the embodiment of the present invention.

Referring to FIG. 10, a first MS (MS 0) is the D2D device having two reference points, and a second MS (MS 1) is the D2D device that performs D2D direct communication with the first MS. The first MS may estimate its position by using the second MS as additional reference point. At this time, it is assumed that the second MS is the D2D device that exactly knows its position.

Referring to FIG. 10, it is noted that the first MS is located at one of position Pa1 and position Pa0. Accordingly, the first MS may estimate one of the two positions, which makes the distance between the first MS and the second MS be close to $d_{m2m}$ for D2D direct communication, as the position of the first MS.

Alternatively, the first MS may newly estimate the distance between the first MS and the second MS by combining $d_{m2m}$, which is distance information with the second MS, with distances d0 and d1 which are distances between AP0 and AP1. At this time, distance estimation may be performed in such a manner that a weight value may be given to each distance depending on a type of radio access technology (RAT) or D2D direct communication.

Figure 11:
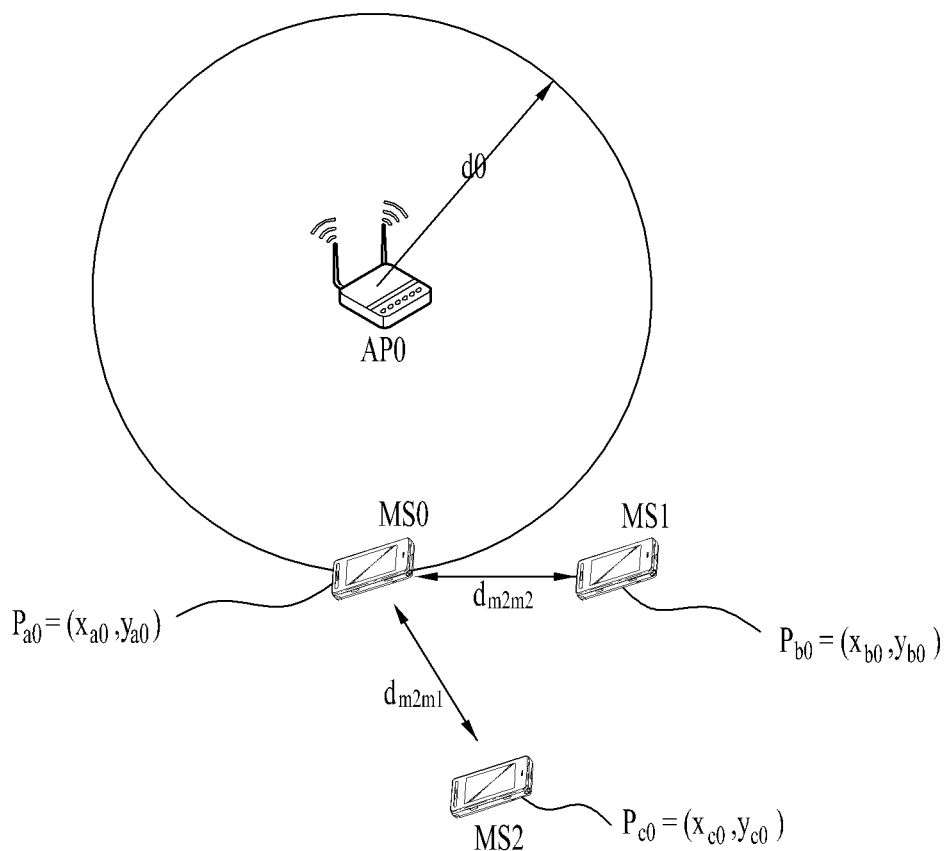
FIG. 11 is a diagram illustrating one of methods for allowing D2D devices having one reference point to estimate a position through D2D direct communication in accordance with the embodiment of the present invention.

FIG. 11 is a diagram illustrating one of methods for allowing D2D devices having one reference point to estimate a position through D2D direct communication in accordance with the embodiment of the present invention.

The D2D device having one reference point may perform position estimation through D2D direct communication by using two neighboring D2D devices as additional reference points. At this time, it is assumed that the neighboring D2D devices exactly know their positions.

Referring to FIG. 11, the first MS is located at Pa0 which is one point on a circumference of which radius is d0 around AP0. The first MS (that is, MS0) may obtain dmsm1 and dm2m2, which are distance estimation information to the second MS (that is, MS1) and the third MS (that is, MS2), by using D2D direct communication, and may estimate the position of the first MS by using the obtained distance estimation information.

At this time, the D2D devices may estimate each distance in such a manner that a weight value is given to each distance depending on a type of RAT or D2D direct communication.

Figure 12:
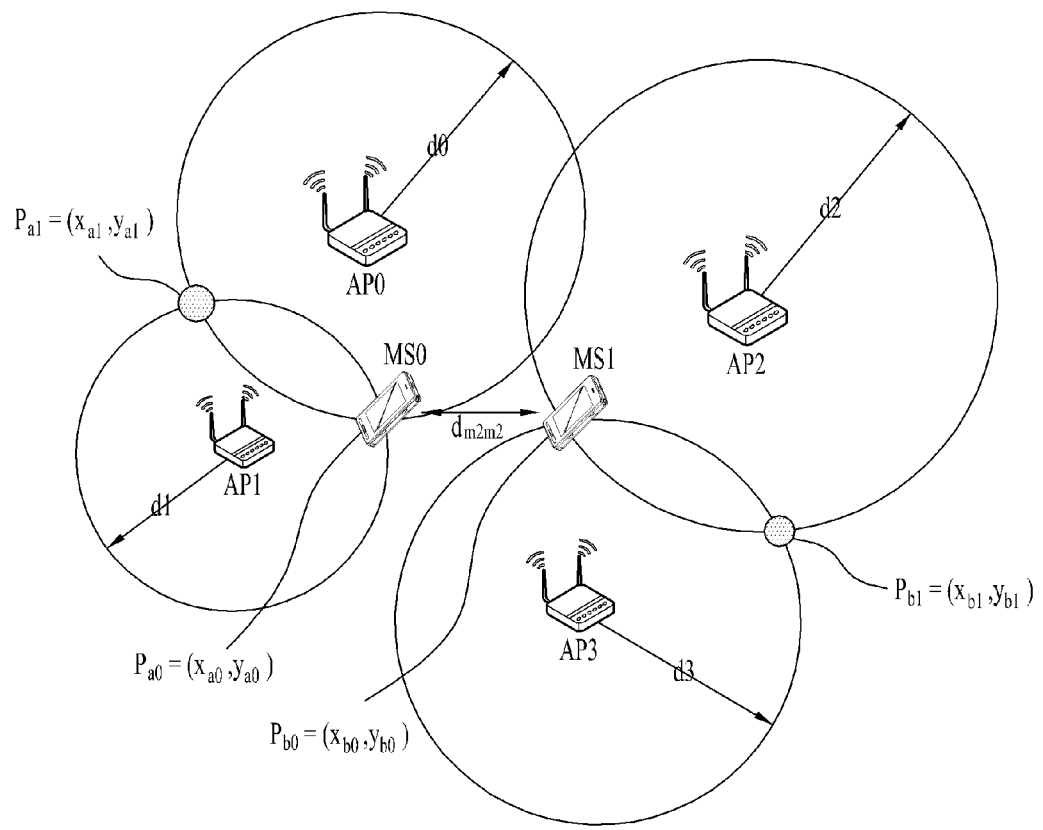
FIG. 12 is a diagram illustrating the other one of methods for allowing D2D devices having two reference points to estimate a position through D2D direct communication in accordance with the embodiment of the present invention.

FIG. 12 is a diagram illustrating the other one of methods for allowing D2D devices having two reference points to estimate a position through D2D direct communication in accordance with the embodiment of the present invention.

In FIG. 12, it is assumed that each of the first MS (that is, MS0) and the second MS (that is, MS1) has two reference points. At this time, the first MS and the second MS may estimate their positions by estimating the distance between the devices through D2D direct communication. Also, the first MS and the second MS may share mutual position information through D2D direct communication.

Referring to FIG. 12, the first MS and the second MS respectively have possible positions Pa0 and Pa1, and Pb0 and Pb1. At this time, the first MS and the second MS may obtain distance information dm2m therebetween through D2D direct communication. Afterwards, the positions nearest to the estimated distance information become the positions of the first MS and the second MS.

At this time, after sharing the position information (or coordinate information) acquired briefly by two D2D devices through the request signal and/or the response signal, the first MS and the second MS may measure the distance between the two D2D devices and identify the positions through a coordinate value indicating a minimum measured distance.

For example, the distance between the first MS and the second MS may be one of the distances between Pa0 and Pb0, between Pa0 and Pb1, between Pa1 and Pb0, and between Pa1 and Pb1. At this time, the distance between the first MS and the second MS corresponding to the distance between Pa0 and Pb0, which is the shortest distance, may be determined as dm2m.

Figure 13:
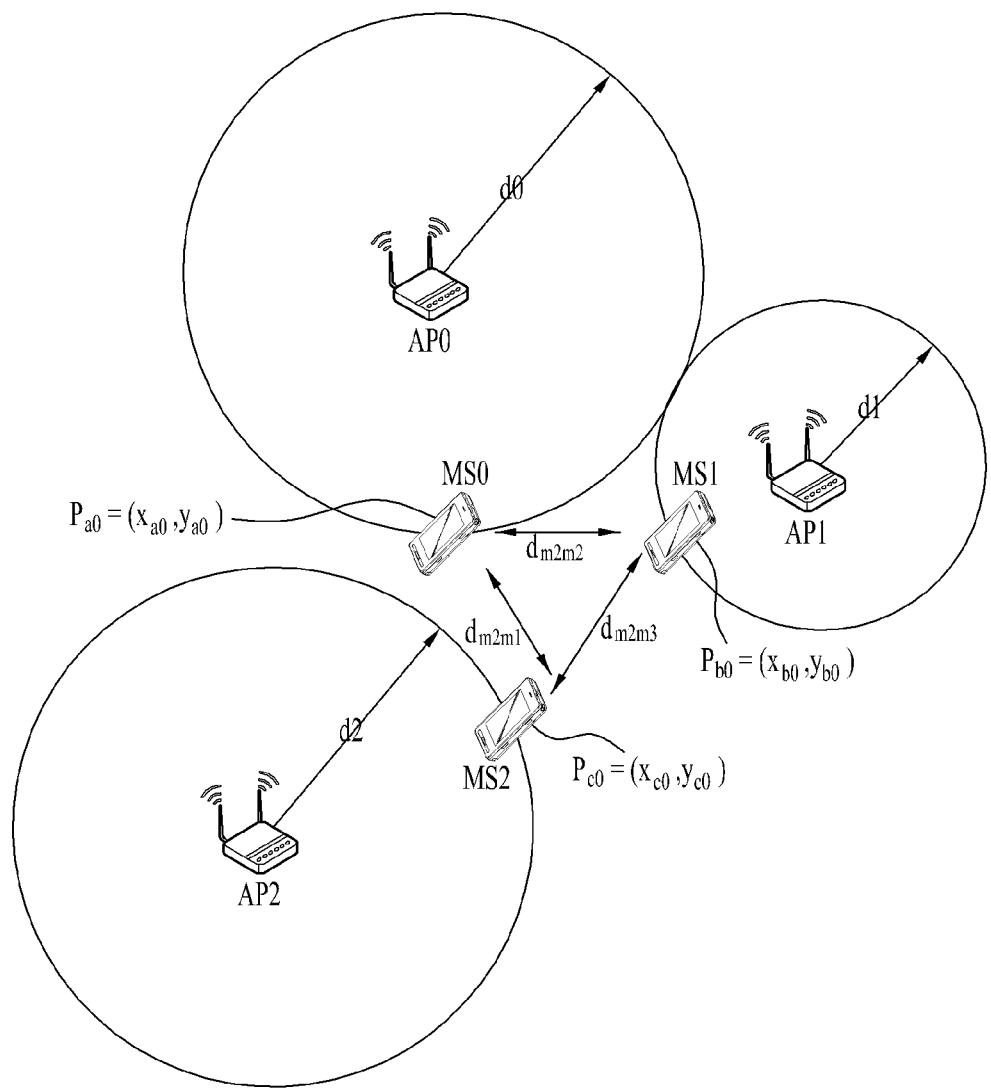
FIG. 13 is a diagram illustrating the other one of methods for allowing D2D devices having one reference point to estimate a position through D2D direct communication in accordance with the embodiment of the present invention.

FIG. 13 is a diagram illustrating the other one of methods for allowing D2D devices having one reference point to estimate a position through D2D direct communication in accordance with the embodiment of the present invention.

In FIG. 13, three D2D devices, each of which recognizes one reference point, may be used to estimate a position.

(1) As one aspect of the present invention, if three D2D devices MS0, MS1 and MS2, each of which recognizes one reference point, are connected with one another through D2D direct communication to recognize mutual distance information (see FIG. 9), one triangle is determined in accordance with gathered distance information.

Afterwards, each circle having a radius as a distance from each of the APs AP0, AP1 and AP2, which are recognized by each D2D device as reference points, to each D2D device is drawn, and a point that satisfies three apexes of a triangle among points on the circumference of each circle may be discovered and then estimated as the position of each D2D device. At this time, the point on the circumference may be discovered using the existing optimized search system.

(2) As another aspect of the present invention, referring to FIG. 13, three D2D devices, each of which recognizes one reference point, may be used for position estimation as follows. The three D2D devices MS0, MS1 and MS2 are located on the circumferences of which radiuses are d0, d1 and d2 around AP0, AP1 and AP2, respectively.

At this time, if the D2D devices obtain information on the distances dm2 ml, dm2m2 and dm2m3 between the devices through D2D direct communication, the position of each D2D device may be estimated as follows. In the present invention, although MS0 is estimated exemplarily, MS1 and MS2 may be estimated equally.

If the MS0 estimates the distances with the MS1 and the MS2 as dm2m2 and dm2 ml, respectively, through D2D direct communication, the distance from the MS0 to the AP1 becomes minimum d1 to maximum d1+dm2m2. In the same manner, the distance from MS0 to AP2 becomes minimum d2 to maximum d2+dm2m1. Accordingly, the MS0 exists on an intersection face between a circle band where the distances with AP1 and AP2 are minimum d1 to maximum d1+dm2m2 and a circle band where the distances with AP1 and AP2 are minimum d2 to maximum d2+dm2m1. A crossing point between the intersection face and a circumference of which distance from AP0 is d0 is selected from a part of a circular arc of which distance with AP0 is d0.

Accordingly, the position of the MS0 may be determined as a specific position (e.g., center) of the circular arc. This manner may equally be applied to the MS1 and the MS2, whereby a circular arc, which may be estimated as a position of each D2D device, may be obtained, and points, which satisfy distances dm2m1, dm2m2, and dm2m3 of the D2D devices, may be obtained with respect to each circular arc, wherein the obtained points may be the positions of the respective D2D devices.

(3) As other aspect of the present invention, in the aforementioned systems, each D2D device may receive information on coverage of each AP as well as the position of each AP and distance information between the AP and the D2D device through D2D direct communication. At this time, the received coverage of the AP may be used to reduce the range of the point where the D2D devices may be located. In other words, the received coverage of the AP may be used as information for estimating the position of the D2D device. For example, if the MS1 recognizes the AP1 only but coverage of the AP0 includes a part of a circumference where the MS1 may be located and which has the AP1 as a center, a part of the circumference where the MS1 may be located, which corresponds to coverage of the AP0, may be excluded from a position estimation value of the MS1.

Figure 14:
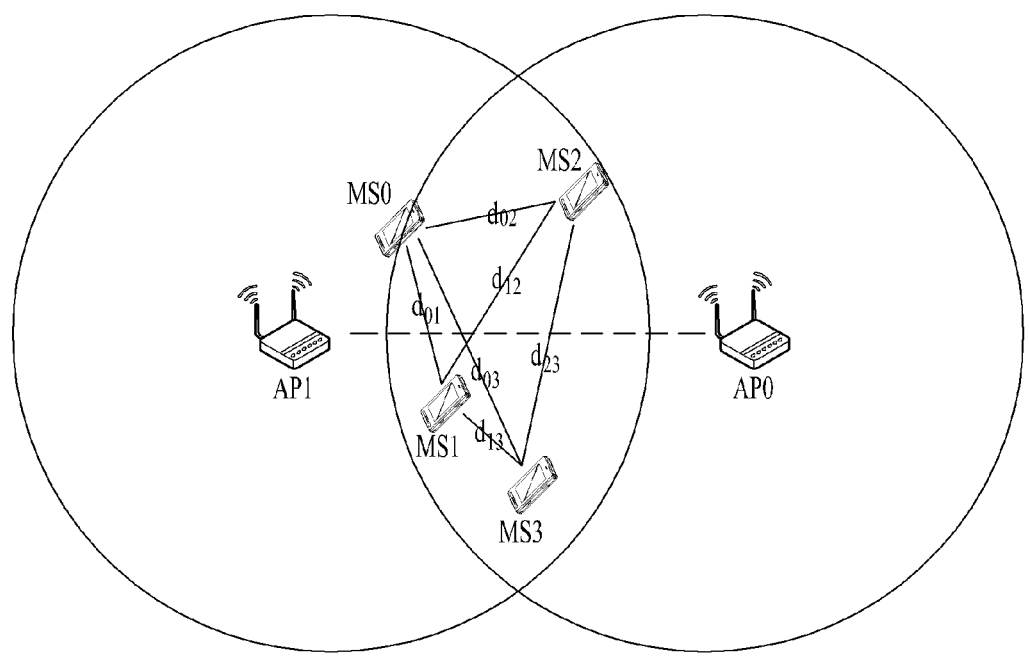
FIG. 14 is a diagram illustrating one of methods for estimating a structure of a D2D communication network in accordance with the embodiment of the present invention.

FIG. 14 is a diagram illustrating one of methods for estimating a structure of a D2D communication network in accordance with the embodiment of the present invention.

A D2D device that enables D2D direct communication may estimate the position as shown in FIGS. 9 to 13 by using additional information (for example, distance estimation information) from a neighboring D2D device. Also, such additional information may be used to identify a structure of a D2D communication network.

In other words, the additional information may be used to identify how the D2D device is arranged and to identify a relative position structure between D2D devices within the network. At this time, the difference between position estimation of the D2D device and structure estimation of the network is as follows. Position estimation is performed to identify an exact relative position based on a specific reference point (for example, AP or neighboring D2D device, etc.) while structure estimation of the network is performed to identify arrangement of the D2D device.

For example, even though the position of the D2D device on the D2D communication network is changed in left and right direction based on a specific reference line (mirror idea), if the same structure is obtained, it is regarded that structure estimation of the network is completed. However, it is not regarded that position estimation of each D2D device is completed.

The D2D device may identify the structure of the D2D network to which it belongs and transmit the identified structure to its AP or share the identified structure with other D2D device. Also, the D2D device may transmit information (for example, positions of the APs recognized by the D2D device, distance with the APs, distance with neighboring D2D devices recognized through D2D direct communication, etc.) for identifying the structure of the D2D network to which it belongs, to its AP or neighboring D2D devices, whereby the AP and/or neighboring D2D devices may identify the structure of the D2D network.

The D2D devices may estimate the structure of the D2D communication network by using distance estimation information between the D2D devices, which is acquired through FIG. 9 to FIG. 13. At this time, the D2D devices may transmit the estimated information to the AP.

Two or more D2D devices which share two same APs only may exchange distance estimation information by using D2D direction communication, thereby identifying the structure of the D2D network as shown in FIG. 14.

Referring to FIG. 14, the D2D devices which recognize two same APs may exist in one of two positions spaced apart from each other at the same distance in a line (dotted line) connecting the two APs with each other. Accordingly, the D2D devices which recognize two same APs have two possible positions, and the number of sets of possible positions becomes 2N when the number of D2D devices is N.

However, if sets that satisfy the distance between the D2D devices is obtained through distance information of the D2D devices, only two sets having a line symmetry structure with respect to the line connecting the two APs with each other become the sets of possible positions of the D2D device. At this time, the two sets have a line symmetry structure with respect to the line connecting the two APs with each other, the structures of the D2D networks may be provided equally. Accordingly, the D2D devices that recognize two same APs may identify the structure of the D2D network through D2D direct communication.

6. Multi-RAT Based Position Estimation System

The aforementioned position estimation systems need three reference points with respect to one RAT (Radio Access Technology). Hereinafter, even the D2D device does not have three reference points with respect to one RAT, a method for performing position estimation by using a reference point of another RAT will be described.

The current position estimation system mainly uses ToA system based on GPS. The ToA system is a correction system for estimating an exact position by using a signal of a cellular network or a wireless local area network (WLAN). Also, a problem occurs in that the D2D device (i.e., MS) should recognize three reference points (for example, base station, satellite, or AP) with respect to one kind of RAT to perform position estimation even though GPS is not used. To solve this problem, the following systems may be used for multi-RAT (MRAT). In this case, the MRAT means a device that supports one or more radio access technologies.

The MRAT device that supports MRAT may perform position estimation by gathering reference signals from all the reference points of the MRAT. For example, if the MRAT device recognizes reference points of GPS, WiFi, and LTE/LTE-A, which are various radio access technologies, one by one, the MRAT device may recognize three reference points. Accordingly, the MRAT device may perform position estimation based on the ToA system by using the distance acquired from the MRAT.

The MART device may perform position estimation by aggregating distance information from all the reference points of the multi-RAT. In other words, the MRAT device may perform position estimation (e.g., ToA system) by using distance information from the reference point corresponding to each RAT if reference points of all the RATs recognized by the MRAT device are three or more even though the MRAT device does not have three reference points for each RAT.

At this time, the MRAT device may have hardware (H/W) or software (S/W) device, which may share distance information from the reference point of each RAT.

Such a device may estimate a portion of the MRAT device by aggregating distance information from the reference point that belongs to each RAT.

Alternatively, such a device may convert distance information from the reference point, which belongs to each RAT, to distance information on a specific RAT and forward the converted distance information to a position estimation module corresponding to the specific RAT, thereby estimating the position of the MRAT device by using the position estimation module of the specific RAT. For example, if a format of distance information is varied depending on each RAT, the MRAT device may perform position estimation by changing each format of the distance information to a format of a specific RAT.

The described in the section 6 may be applied to the methods described in FIGS. 9 to 14. For example, two reference points recognized by the D2D device may be base stations, APs, or fixed nodes, which belong to their respective RATs different from each other.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is also obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

The embodiments of the present invention may be applied to various wireless access systems. Examples of the various wireless access systems include 3GPP (3rd Generation Partnership Project) system, 3GPP2 system and/or IEEE 802.xx (Institute of Electrical and Electronic Engineers 802) system. The embodiments of the present invention may be applied to all the technical fields based on the various wireless access systems as well as the various wireless access systems.

The invention claimed is:

1. A method for estimating positions of devices in a wireless access system which supports D2D (Device to Device) direct communication, the method comprising:
    acquiring two candidate positions of the D2D device from two reference points;
    acquiring distance estimation information regarding a distance between the D2D device and a neighboring D2D device through D2D direct communication;
    applying a weight value that corresponds to the D2D direct communication to the distance estimation information; and
    performing position estimation of the D2D device by selecting one of the two candidate positions using the distance estimation information to which the weight value is applied.

2. The method according to claim 1, further comprising:
    transmitting, from the D2D device to the neighboring D2D device, a request signal for acquiring the distance estimation information; and
    receiving a response signal from the neighboring D2D device in response to the request signal,
    wherein the distance estimation information is acquired based on the response signal.

3. The method according to claim 2, wherein the request signal includes absolute time information or relative time information, and the response signal includes received time information on the request signal, time offset, or information on transmitted time of the response signal.

4. The method according to claim 2, wherein the neighboring D2D device has two reference points, and the distance estimation information is a coordinate where a measured distance between the D2D device and the neighboring D2D device has a minimum value.

5. The method according to claim 1, wherein the D2D device periodically transmits a reference signal to the neighboring D2D device to acquire the distance estimation information.

6. A D2D device for estimating a position in a wireless access system which supports D2D (Device to Device) direct communication, the D2D device comprising:
    a radio frequency (RF) module; and
    a processor for performing position estimation and configured to:
        acquire two candidate positions of the D2D device from two reference points,
        acquire distance estimation information regarding a distance between the D2D device and a neighboring D2D device through D2D direct communication,
        applies a weight value that corresponds to the D2D direct communication to the distance estimation information, and
        perform position estimation of the D2D device by selecting one of the two candidate positions using the distance estimation information to which the weight value is applied.

7. The D2D device according to claim 6, wherein the processor transmits a request signal for acquiring the distance estimation information to the neighboring D2D device and receives a response signal from the neighboring D2D device in response to the request signal, and the distance estimation information is acquired based on the response signal.

8. The D2D device according to claim 7, wherein the request signal includes absolute time information or relative time information, and the response signal includes received time information on the request signal, time offset, or information on transmitted time of the response signal.

9. The D2D device according to claim 8, wherein the neighboring D2D device has two reference points, and the distance estimation information is a coordinate where a measured distance between the D2D device and the neighboring D2D device has a minimum value.

10. The D2D device according to claim 6, wherein the D2D device periodically transmits a reference signal to the neighboring D2D device to acquire the distance estimation information.

* * * * *